United States Patent
Koki et al.

(10) Patent No.: US 12,009,747 B2
(45) Date of Patent: Jun. 11, 2024

(54) DEVICE, METHOD AND SYSTEM FOR PROGRAMMING A POWER SUPPLY TO FACILITATE DYNAMIC PERFORMANCE TUNING

(71) Applicant: Intel Corporation, Santa Clara, CA (US)

(72) Inventors: Tarakesava Reddy Koki, Bangalore (IN); Vinaya Kumar Chandrasekhara, Bangalore (IN); Aiswarya Pious, Bangalore (IN); Nirmala Bailur, Bangalore (IN); Jagadish Vasudeva Singh, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 656 days.

(21) Appl. No.: 17/133,442

(22) Filed: Dec. 23, 2020

(65) Prior Publication Data

US 2022/0200452 A1 Jun. 23, 2022

(51) Int. Cl.
| | |
|---|---|
| *G06F 1/26* | (2006.01) |
| *G06F 1/28* | (2006.01) |
| *H02J 7/00* | (2006.01) |
| *H02M 1/088* | (2006.01) |
| *H02M 3/158* | (2006.01) |

(52) U.S. Cl.
CPC ............. *H02M 3/158* (2013.01); *G06F 1/28* (2013.01); *H02J 7/0068* (2013.01); *H02M 1/088* (2013.01)

(58) Field of Classification Search
CPC ........ H02J 7/0068; H02J 7/007; H02J 7/0071; H02J 3/007; H02J 3/0075; H02J 3/46; H02J 3/466; G06F 1/26; G06F 1/28; G06F 2207/30; G06F 2211/1071; H02M 3/158; H02M 1/08; H02M 1/088
See application file for complete search history.

(56) References Cited

U.S. PATENT DOCUMENTS

| | | | |
|---|---|---|---|
| 10,747,284 B2 | 8/2020 | Koki et al. | |
| 11,262,826 B2 * | 3/2022 | Hand | G06F 1/266 |
| 2017/0293335 A1 | 10/2017 | Dunstan et al. | |
| 2020/0227933 A1 | 7/2020 | Schiff et al. | |
| 2022/0407344 A1 * | 12/2022 | Cha | H02J 7/0068 |

* cited by examiner

*Primary Examiner* — Long Nguyen
(74) *Attorney, Agent, or Firm* — NICHOLSON DE VOS WEBSTER & ELLIOTT LLP

(57) ABSTRACT

Techniques and mechanisms for determining a delivery of power by a programmable power supply. In an embodiment, controller circuitry of a platform receives an indication that a load of the platform is to transition to a particular operational mode. Based on a power requirement of the operational mode, the controller circuitry identifies a mode of voltage regulation which is to be provided with converter circuitry of the platform. The controller circuitry signals that a programmable power supply, which is coupled to the platform, is to output a supply voltage at a level which is based on an amount of power loss associated with the mode of voltage regulation. In another embodiment, the controller circuitry identifies the mode of voltage regulation based on an amount of charge which is currently stored by a battery of the platform.

20 Claims, 6 Drawing Sheets

DEVICE, METHOD AND SYSTEM FOR PROGRAMMING A POWER SUPPLY TO FACILITATE DYNAMIC PERFORMANCE TUNING

BACKGROUND

1. Technical Field

This disclosure generally relates to power delivery and more particularly, but not exclusively, to operation of a programmable power supply.

2. Background Art

The Universal Serial Bus (USB) Power Delivery (USB-PD) Specification Revision 2.0 V1.2 of Mar. 25, 2016 states that the USB has evolved from a data interface capable of supplying limited power to a primary provider of power with a data interface. Today, many devices charge or get their power from USB ports contained in laptops, cars, aircraft, or even wall sockets. USB has become a ubiquitous power socket for many small devices such as cell phones, MP3 players and other hand-held devices. Users need USB to fulfill their requirements not only in terms of data but also to provide power to, or charge, their devices simply, often without the need to load a driver, in order to carry out "traditional" USB functions.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1:
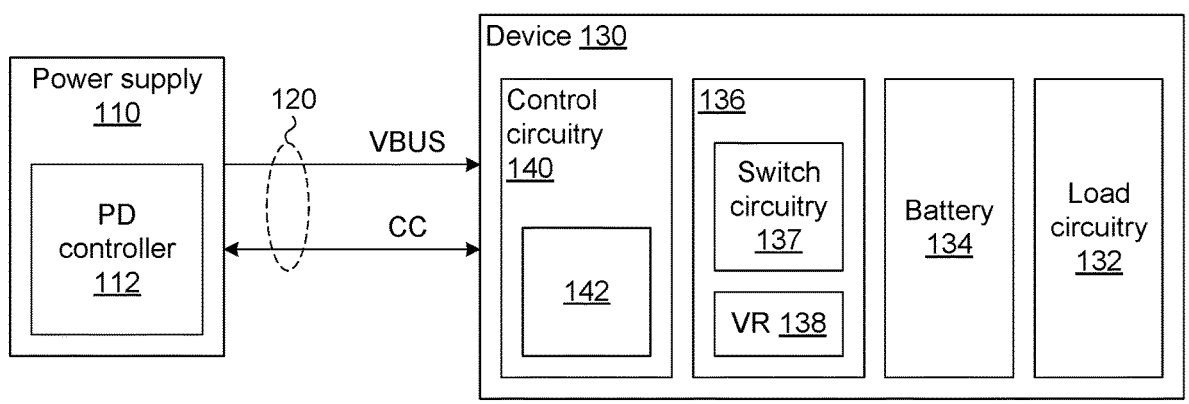
FIG. 1 illustrates a functional block diagram showing features of a system to provide a voltage with a programmable power supply according to an embodiment.

Embodiments discussed herein variously provide techniques and mechanisms for determining a delivery of power to a computer device. The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including circuitry which supports configuration of a programmable power supply.

In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

FIG. 1 illustrates a system 100 to determine a power level to be provided to a platform according to an embodiment. System 100 is one example of an embodiment wherein a programmable power supply (PPS) is configured to output a particular voltage level which is requested based on an actual or expected operational mode of a platform which is to be powered with said voltage level. As used herein, "programmable power supply" refers to a device—such as a power adapter, docking station, or the like—which is configurable (e.g., reconfigurable) to change a voltage level and/or other characteristic of a power output by the device.

Certain features of various embodiments are described herein with reference to a programmable power supply (PPS) which provides connection hardware compatible with Universal Serial Bus (USB) standard such as that of the USB Type-C Specification 1.0 finalized by the USB Implementers Forum (USB-IF) in August 2014, the USB 3.2 specification, released by the USB-IF in September 2017, the USB 4.0 specification released by the USB-IF in 2019, or the like. Such example programmable power supplies are further described herein as supporting programmable power delivery capabilities which are compatible with a power delivery standard such as that of the USB Power Delivery Specification, Revision 2.0, Version 1.3, released Jan. 12, 2017 by the USB-IF, the USB Power Delivery Specification Revision 3.0 Version 2.0, released Feb. 7, 2020 by the USB-IF, or the like. However, such description may be extended to additionally or alternatively apply to a PPS which comprises any of a variety of other types of connection hardware and/or which provides any of a variety of other types of programmable power delivery capabilities.

As shown in FIG. 1, system 100 comprises a device 130 and a power supply 110 which is coupled thereto via interconnect structures (such as those of the illustrative cable bundle 120 shown). By way of illustration and not limitation, cable bundle 120 is a USB Type-C cable bundle—e.g., wherein power supply 110 is an AC/DC (or other) adapter, a docking station, or any of various other suitable devices which provide programmable power supply functionality. In some embodiments, system 100 omits one or both of power supply 110 and cable bundle 120—e.g., wherein some or all embodiments are variously implemented each with only respective components of device 130.

Device 130 and power supply 110 variously provide functionalities to operate as power consumer and power provider, respectively. For example, device 130 supports coupling of system 100 to an alternating current (AC) source (not shown)—such as a typical wall socket—for receiving AC voltage and current. In an embodiment, cable bundle 120 comprises one or more voltage supply lines VBUS by which power is to be delivered with power supply 110 to device 130. Power supply 110 illustrates a device (such as a power adapter, docking station or the like) which is configurable—e.g., reconfigurable—to facilitate any of various types of power delivery at different times. For example, power supply 110 is (re)programmable to change a level of a voltage which is to be provided to device 130 via line(s) VBUS.

Cable bundle 120 further comprises one or more signal lines CC to facilitate communication between power supply 110 and device 130—e.g., wherein some or all such communications are to facilitate a negotiation of a particular type of power delivery via line(s) VBUS. A communication of power negotiation messages (e.g., sending a source capabilities list or menu and a selection from that list) between device 130 and power supply 110 is performed over the CC wire(s) of cable bundle 120. In one such embodiment, power supply 110 comprises a power delivery (PD) controller 112—e.g., including an application specific integrated circuit, programmable gate array and/or other suitable circuitry—to participate in negotiations with control circuitry 140 of device 130, and to configure a delivery of power with line(s) VBUS. In various embodiments, PD controller 112 is implemented in hardware or software (or a combination of both) and is responsible for communicating with device 130. In various embodiments, cable bundle 120 further comprises one or more other wires (not shown), such as USB2, USB3, SBU1/SBU2, GND, etc.

Device 130 illustrates any of a variety of consumer devices (e.g., phone, laptop, printer, etc.) which is adapted to configure a programmable power supply to support one of multiple possible operational modes of said consumer device. In the example embodiment shown, device 130 comprises one or more components (e.g., including the illustrative load circuitry 132 shown) which are to serve as a load for power provided with power supply 110. By way of illustration and not limitation, load circuitry 132 includes one or more processors, sensors, memory devices, display devices, input/output circuits, cellular phone hardware, and/or the like. In an illustrative scenario according to one embodiment, load circuitry 132 comprises a processor of a first integrated circuit (IC) chip, such as a system-on-chip (SOC), and one or more of other circuitry of said first IC chip, circuitry of another IC chip in a first packaged device with the first IC chip, circuitry of another packaged device which is coupled to the first packaged device, or the like. By way of illustration and not limitation, load circuitry 132 comprises a CPU and a GPU which, for example, is in a same package (and, in some embodiments, on the same IC chip) as the processor. Additionally or alternatively, load circuitry 132 comprises some or all of a graphics card, a memory card, a monitor (or other display device) and/or any of a variety of other power loads which operate with the CPU. However, some embodiments are not limited with respect to a particular type of one or more loads that might operate with a processor of load circuitry 132.

To facilitate operation of load circuitry 132, device 130 further comprises a battery 134 to provide power to load circuitry 132, and circuitry (such as the illustrative regulator/charger 136 shown) to regulate a delivery of power to load circuitry 132 and/or battery 134. In one such embodiment, regulator/charger 136 comprises a voltage regulator VR 138 (e.g., including a buck-boost regulator and/or other switching regulator circuitry) and switch circuitry 137 which is operable to selectively provide switched coupling of VR 138 to one or more other circuit structures of device 130. Operation of switch circuitry 137 and/or VR 138 is provided, for example, with control circuitry (not shown) of regulator/charger 136, with control circuitry 140 and/or other control logic of device 130.

To facilitate the determining of a particular power delivery by power supply 110, device 130 provides control circuitry 140 (e.g., comprising an application specific integrated circuit, programmable gate array and/or other suitable circuit structures) which supports communication with PD controller 112 via line(s) CC of cable bundle 120. In various embodiments, functionality of control circuitry 140 is implemented in hardware or software (or a combination of both) and is responsible for communicating with power supply 110.

System 100 enables operations and negotiations performed by power supply 110 and device 130 to achieve a desired type of power delivery. In an illustrative scenario according to one embodiment, PD controller 112 sends over wire(s) CC a communication—e.g., a Source_Capabilities (SRC_CAPS) message as defined by the USB-PD 2.0 Specification—to identify to control circuitry 140 programmable power supply capabilities which are supported with power supply 110. For example, PD controller 112 sends a menu of available power sources (e.g., Power Data Object(s) (PDO) such as fixed, battery, and variable, plus a tuple of a specific voltage and current) to control circuitry 140 over wire(s) CC. In an illustrative embodiment, the source capabilities include a mandatory vSafe5V (i.e., 5V Fixed Supply) Power Data Object (PDO) and a Variable Output PDO (i.e., Variable Supply (non-battery)). A PDO is used to expose a Source Port's power capabilities or a Sink's power requirements as part of a Source_Capabilities or Sink_Capabilities message, respectively. Here, a Source is power supply 110 and a Sink is device 130.

In one such embodiment, control circuitry 140 receives the menu and inspects PDOs in the menu and selects a favorite choice which, for example, is one of the PDOs offered by the Provider (e.g., where a current specification revision does not allow going off menu). Control circuitry 140 selects an option from the menu of offered PDOs and sends a Request (REQ) message for the selected power delivery option to power supply 110—e.g., where the REQ message is compatible with a standard request message format such as one defined in Table 6-3 Data Message Types of UBS-PD 2.0 Specification.

Based on the REQ message from device 130, PD controller 112 ensures whether it can provide the selected power supply requested at the moment, and sends to control circuitry 140 an ACCEPT message or a REJECT message as appropriate. If a REJECT message is generated (e.g., power supply 110 is unable to provide the requested supply level), PD controller 112 waits for a new Request to service. If an ACCEPT message is generated (e.g., power supply 110 is able to provide the requested power supply), PD controller 112 switches power supply 110 to the Requested parameters and sends PS_RDY (Power Supply Ready) indication to control circuitry 140.

At device 130, control circuitry 140 waits for and receives the answer from PD controller 112 (e.g., ACCEPT or REJECT message). In some embodiments, if device 130 receives a REJECT message from PD controller 112, control circuitry 140 performs operations to identify and request a next-best one of the available power delivery options. By contrast, if an ACCEPT message is received, control circuitry 140 waits for a new power indication from PD controller 112 in the form of the PS_RDY (Power Supply Ready) message.

In some embodiments, control circuitry 140 participates in, or otherwise facilitates, communications to negotiate a level of a voltage that power supply 110 is to provide via supply line(s) VBUS, wherein the level is determined based on a mode of operation by load circuitry 132 and, in some embodiments, also on another mode which is to be provided with circuitry of regulator/charger 136. To avoid confusion, these modes are referred to herein as an "operational mode" and a "voltage regulation mode" (respectively). In one such embodiment, the voltage to be provided by power supply 110 is determined based on a power loss by regulator/charger 136, where said power loss is due to a given voltage regulation mode (and/or due to parasitic characteristics of a connector, board, or other such components). For example, various voltage regulation modes of regulator/charger 136 each result in a different respective power loss by regulator/charger 136.

A given one such operational mode determines one or more characteristics of actual or expected power consumption by load circuitry 132. For example, a given operational mode determines, for each of one or more parameters of resource utilization, a respective threshold minimum value, a respective threshold maximum value, a respective expected average value, and/or the like. In various embodiments, such resource utilization parameters include—but are not limited to—one or more of a processor (or other) clock frequency, a voltage limit, a current limit, a thermal condition, a number of active processor cores, a number of execution threads, a signal communication rate, etc.

By way of illustration and not limitation, one or more operational modes of device 130 are each based on a respective type and/or number of one or more software processes to be executed by processor logic of load circuitry 132. For example, a given power mode includes or is otherwise based on whether and/or how processor logic is to execute one of a gaming application, a live streaming process, a video conference application, a process to play audio and/or video content, and/or the like. Alternatively or in addition, one or more operational modes of load circuitry 132 each include, or are otherwise based on, a respective orientation of one or more components (e.g., IO devices) of device 130. For example, in one such embodiment, power supply 110 is a hinged device (e.g., a clamshell device, laptop or the like), wherein operational modes of power supply 110 include one or more of a laptop mode, a tablet mode, a book mode, a tent mode (one person, or two person), a phone mode, and/or the like.

Some embodiments are not limited with respect to a particular one or more operational modes of load circuitry 132, or a particular basis on which (or means by which) a given operational mode—e.g., a given transition to or from said operational mode—is identified to control circuitry 140. For example, although some embodiments are not limited in this regard, load circuitry 132 includes or otherwise operates based (for example) on dynamic tuning logic with which a given operational mode is determined—e.g., where the dynamic tuning logic provides a corresponding configuration of load resources in support of said operational mode. In various embodiments, such dynamic tuning logic is compatible with an Intel® Dynamic Tuning Technology (or other suitable technology) which supports user-defined configurations of resources for various operational modes. In an illustrative scenario according to one embodiment, dynamic tuning logic operates to accommodate a Thermal Design Power (TDP) for a combination of resources including, for example, a general purpose processor of an IC chip (such as an SOC), and one or more other components such as (but not limited to), other circuitry of said IC chip, another IC chip, a graphics card, a display device, and/or the like.

Unless otherwise indicated, "voltage regulation mode" refers herein to a mode of configuring or otherwise operating circuitry such as that of regulator/charger 136 (e.g., the circuitry including a voltage converter and one or more switch circuits) to provide at a first node—which is between a battery and one or more load components—a first voltage which is based on a second voltage provided by a programmable power supply. By way of illustration and not limitation, regulator/charger 136 supports any of multiple voltage regulation (VR) modes including, for example, a "bypass" mode wherein switch circuitry 137 switchedly provides a conductive path which bypasses VR 138. Alternatively or in addition, such multiple VR modes comprise one or more modes which each provide a respective conductive path between VR 138 and supply line(s) VBUS with switch circuitry 137—e.g., including a static "pass-through" mode wherein switch circuitry 137 switchedly provides a conductive path through an inductor of VR 138. In one such embodiment, some or all of the one or more modes each include a respective one of a buck mode of operation of VR 138, a boost mode of operation of VR 138, a buck-boost mode of operation of VR 138, or the like.

As described herein, control circuitry 140 determines a voltage level to be output by power supply 110 based on a correspondence of a given operational mode of load circuitry 132 with a respective plan (referred to herein as a "power delivery plan") to facilitate one or more characteristics of power delivery in support of said operational mode. In an embodiment, a power delivery plan (PDP) specifies or otherwise indicates a level of a first voltage which is to be provided to a first node by which battery 134 is coupled to load circuitry 132. Alternatively or in addition, such a PDP indicates a particular VR mode for regulator/charger 136. In various embodiments, the PDP is defined by or otherwise determined with dynamic tuning logic which, for example, is compatible with the Intel® Dynamic Tuning Technology (DTT), is provided with embedded controller circuitry, and/or the like.

In the example embodiment shown, control circuitry 140 includes, is coupled to, or otherwise operates based on configuration state 142 (e.g., including one or more lookup tables and/or other reference information) which specifies or otherwise indicates a correspondence of various operational modes of load circuitry 132 each with a respective one or more characteristics of power delivery to load circuitry 132. Configuration state 142 is provided for example, with one or more memory resources, a state machine, an application specific integrated circuit, a programmable gate array and/or any of various other suitable circuit structures.

In response to an indication that load circuitry 132 has transitioned (or is expected to transition) to a particular operational mode, control circuitry 140 accesses configuration state 142 to select one of multiple PDPs—e.g., wherein such selection is based on the particular operational mode (and, in some embodiments, also on a current amount of charge stored by battery 134). As indicated above, some or all such PDPs, in various embodiments, are defined by or otherwise determined with dynamic tuning logic which is compatible with the Intel® Dynamic Tuning Technology (DTT), is provided with embedded controller circuitry, and/or the like. Based on the selected PDP—e.g., based on a first level of a first voltage to provide to load circuitry 132, and further based on a selected VR mode of regulator/charger 136—control circuitry 140 requests that power supply 110 output a second voltage at a second level. In one such embodiment, the requested second level accounts for a power loss by regulator/charger 136 which is to be due at least in part to the selected VR mode. In some embodiments, control circuitry 140 further signals regulator/charger 136 to provide the selected VR mode.

Figure 2:
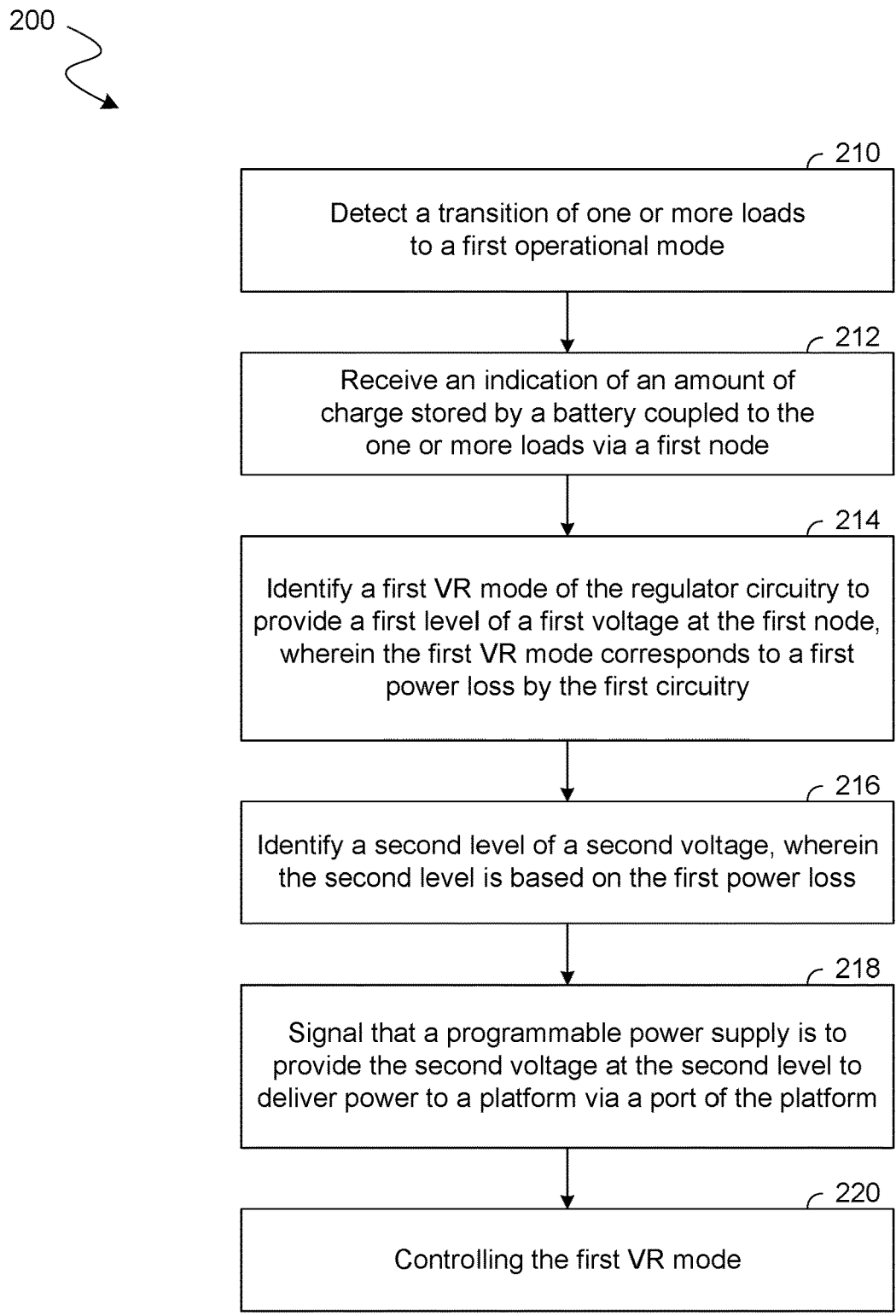
FIG. 2 illustrates a flow diagram showing features of a method to configure a programmable power supply according to an embodiment.

FIG. 2 shows features of a method 200 to determine a delivery of power from a programmable power supply to a load of a platform according to an embodiment. Method 200 is one example of an embodiment wherein hardware logic and/or software logic (e.g., provided with control circuitry 140) determines a level of a voltage that is to be provided by a power adapter, docking station, or other suitable device which supports operation as a programmable power supply. The level of said voltage is determined, for example, based on a power delivery policy which corresponds to an operational mode of the load (and, for example, to an amount of charge stored at a battery of the platform). In one such embodiment, the level of the voltage is further based on an amount of power loss (if any) which is due to a mode of voltage regulation by the platform. In some embodiments, method 200 is performed with circuitry of device 130—e.g., wherein control circuitry 140 performs some or all of method 200.

As shown in FIG. 2, method 200 comprises (at 210) detecting a transition of one or more loads of a platform— such as load circuitry 132 of device 130—to a first operational mode. The platform comprises the one or more loads, a port, regulator circuitry coupled between the port and a first node, and a battery coupled to the one or more loads via the first node. For example, in one embodiment, the regulator circuitry and battery are regulator/charger 136, and battery 134 (respectively), wherein the port is to couple device 130 to supply line(s) VBUS and signal line(s) CC.

The detecting at 210 comprises detecting that the one or more loads have transitioned (or are expected to transition) between two of multiple possible operational modes. In some embodiments, one or more of said multiple operational modes are each based on a respective orientation of a IO component (e.g., a display or keyboard) of the platform relative to a vertical direction and/or relative to another IO component of the platform. For example, such one or more operational modes comprise a laptop mode, a tablet mode, a book mode, a tent mode (one person, or two person), a phone mode, and/or the like. Alternatively or in addition, one or more of the multiple operational modes are each based on whether the platform is coupled to operate in a multi-display configuration with one or more external devices (e.g., including a television, tablet, monitor, or the like). Alternatively or in addition, one or more of the multiple operational modes are each based on a particular type of software process to be performed—e.g., where the software process comprises one of a gaming application, a live streaming process, a video conference application, a process to play audio and/or video content, and/or the like.

Method 200 further comprises (at 212) receiving an indication of an amount of charge stored by the battery, and (at 214) identifying, based on the transition and the amount of charge, a first voltage regulation (VR) mode of the regulator circuitry. The first VR is to provide a first level of a first voltage at the first node, and corresponds to a first power loss by the first circuitry. In an embodiment, the identifying at 214 comprises detecting a voltage output capability of the battery based on the amount of charge, and determining—e.g., according to a power delivery policy— whether (or not) power is to be drawn from the battery in support of the operational mode, and/or whether (or not) at least some charging of the battery is to take place during the operational mode.

Method 200 further comprises (at 216) identifying, based on the transition and the amount of charge, a second level of a second voltage, wherein the second level is based on the first power loss. In various embodiments, the identifying at 214 and 216 comprises accessing reference information (e.g., one or more lookup tables and/or other resources of configuration state 142) based on the operational mode detected at 210—e.g., where the reference information specifies or otherwise indicates a correspondence of the first VR mode and/or the second level with the operational mode. For example, the reference information identifies a combination of the operational mode, and the amount of charge stored by the battery, as corresponding to a particular power delivery policy. In one such embodiment, the reference information identifies various ones of such combinations as each corresponding to a respective one of various power delivery policies. A given one of said power delivery policies specifies or otherwise indicates some or all of an amount of power to be delivered from the first node (e.g., including a minimum voltage level required at the first node), a VR mode of the regulator circuitry, an amount of power loss corresponding to said VR mode, and/or a state of switched coupling of the battery to (or decoupling of the battery from) the first node.

The operational mode comprises (for example) a combination of respective configurations of multiple loads comprising (for example) a central processing unit and a graphics processing unit. In one such embodiment, the identifying at 214 and 216 is based on a thermal design point of the multiple loads. Additionally or alternatively, the identifying the second level at 216 comprises determining an amount of power to be delivered by a programmable power supply— e.g., wherein said determining is based on a sum of a level of power to be delivered from the first node (as required by the operational mode), and an amount of the first power loss by the regulator circuitry in operating according to the first VR mode.

Method 200 further comprises (at 218) signaling that a programmable power supply—such as power supply 110— is to provide the second voltage at the second level to deliver power to the platform via the port. In some embodiments, the signaling at 218 comprises participating in communications with the programmable power supply via the port, wherein the communications are compatible with a Universal Serial Bus Power Delivery specification. In one such embodiment, the platform is coupled to the programmable power supply via a USB-C connection.

Although some embodiments are not limited in this regard, method 200 further comprises (at 220) controlling the first VR mode of the regulator circuitry. In various embodiments, the regulator circuitry comprises switch circuitry and a converter circuit (e.g., switch circuitry 137 and VR 138, respectively). In one such embodiment, the controlling at 220 comprises operating the switch circuitry to enable a conductive path which bypasses the converter circuit. In other such embodiment, the controlling at 220 comprises operating the switch circuitry to provide a conductive path between the port and the converter circuit, and (for example) controlling one of a buck mode of the converter circuit, or a boost mode of the converter circuit. Additionally or alternatively, the controlling at 220 comprises operating the switch circuitry to disable a conductive path between the battery and the first node.

Figure 3:
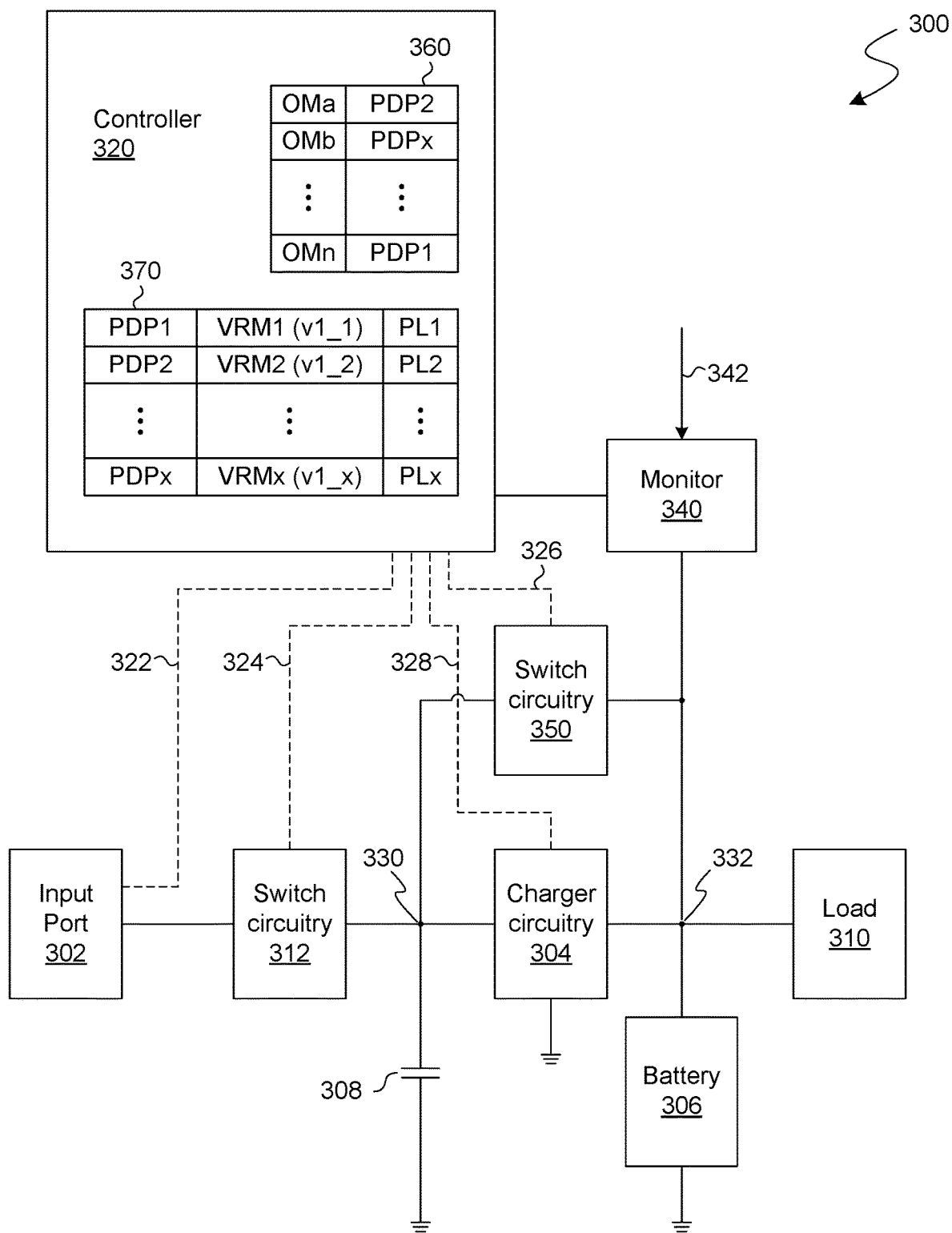
FIG. 3 illustrates a functional block diagram showing features of a system to receive a voltage from a programmable power supply according to an embodiment.

FIG. 3 shows features of a system 300 to configure a programmable power supply according to an embodiment. System 300 is one example of an embodiment wherein a device is operable to determine a level of a voltage to be provided by a PPS, where said level facilitates an actual or expected operational mode of the device. In some embodiments, system 300 provides functionality of device 130 and/or is operable to perform some or all of method 200.

As shown in FIG. 3, system 300 includes a port 302 (for example, a USB-C, USB-C PD, and/or USB-C Thunderbolt enabled port), charger circuitry 304 (e.g., providing functionality of regulator/charger 136), a battery 306, an energy storage 308 (for example, a capacitor), switch circuitry 312, 350 (for example, including one or more power field effect transistors or power FETs, or pass FETs), a monitor 340, and a controller 320. In some embodiments, system 300 further comprises (or alternatively, is to couple to) a system load 310. Alternatively or in addition, some embodiments are implemented entirely with controller circuitry such as that illustrated by controller 320, or (for example) entirely with a combination of controller 320 and monitor 340.

In some embodiments, system 300 comprises a buck-boost charging system, and charger circuitry 304 is a buck-boost charger. Charger circuitry 304 is operable to selectively provide power to system load 310 via a node 332, and/or is operable to charge battery 306 via node 332 when a PPS is connected at port 302. As illustrated in FIG. 3, a buck-boost configured battery charger such as charger circuitry 304 is operable to switchedly decouple the node 330 and node 332. In some embodiments, node 332 (which, for example, is to function as a system power rail) is coupled to the power port 302 via switches (not shown) of charger circuitry 304 and, in some embodiments, via switch circuitry 312. Node 332 is further coupled to node 330 via switch circuitry 350 which, for example, is operable to switchedly provide conductive path which bypasses charger circuitry 304.

In some embodiments, system load 310 is a mobile computing system, such as, for example, a smartphone, tablet, laptop computer, etc., among others. In one example embodiment, system load 310 includes a processor, a memory, one or more communication devices, and/or any of various other computing device components that are coupled to be selectively powered by rechargeable battery 306 and/or an external PPS (not shown in FIG. 3). In some embodiments, battery 306 provides power to system load 310 when an external PPS is not coupled to system 300 via port 302. In some embodiments, battery 306 is a lithium-ion battery pack. In some embodiments, other rechargeable or non-rechargeable batteries are used.

In some embodiments, energy storage 308 is selectively coupled at various times to supplement the voltage provided by battery 306 to system load 310. For example, energy storage 308 includes one or more components for input decoupling of charger circuitry 304 in the form of one or more capacitors coupled together (for example, in series). Energy storage 308 is implemented, for example, by one or more individual capacitors coupled together in parallel or in series.

In some embodiments, energy storage 308 is charged to create an energy storage that has the capability of smoothing out peaks of system power. That is, energy storage 308 is available for use as a form of a battery, and battery 306 is able to be supplemented during a peak power scenario. That is, the battery 306 is supplemented by energy storage 308 when the battery nears a low voltage scenario that poses a risk of system failure. In an example scenario according to one embodiment, energy storage 308 is able to be charged up to 20V and the charger circuitry 304 bucks the voltage from 20V down to the voltage of the battery to supplement battery 306. In this manner, input decoupling (for example, input decoupling using switch circuitry 312 and/or one or more switches of charger circuitry 304) is used to facilitate a storage of charge with energy storage device 308.

In some embodiments, monitoring hardware (e.g., including circuitry of the illustrative monitor 340 shown) monitors the voltage and/or power provided to system load 310 to determine whether power delivery to system 300 via port 302 (and/or whether power delivery by charger circuitry 304) needs to be modified. In one such embodiment, monitor 340 further performs monitoring to detect whether—according to some predetermined criteria—system 300 has transitioned to (or is expected to transition to) an operational mode which includes a state of load 310. For example, monitor 340 is coupled to receive one or more signals, such as the illustrative signal 342 shown, which indicates an actual or expected transition of system 300 to one of a plurality of operational modes which correspond to respective power use characteristics (e.g., each including a respective one or more power requirements and/or one or more power constraints). Signal 342 is provided, for example, by any of various types of power management hardware and/or executing software which determine whether and/or how power utilization by system 300 is to be modified. Some embodiments are not limited to a particular basis on which, and/or a particular resource from which, signal 342 is communicated to monitor 340.

In some embodiments, charger circuitry 304 charges battery 306 and at times charges energy storage 308 when a PPS is not present (for example, at port 302). In some embodiments, charger circuitry 304 charges battery 306 and/or energy storage 308 when the voltage being supplied by battery 306 to system load 310 is above a predetermined threshold level. In such embodiments, charger circuitry 304 might not charge energy storage 308 when the voltage being supplied by battery 306 to system load 310 is below said threshold level. In some embodiments, the voltage monitoring hardware monitors the voltage being supplied by battery 306 to system load 310 to facilitate a determination by controller 320 as to whether/when charger circuitry 304 is to charge one or both of energy storage 308 and battery 306.

In some embodiments, charger circuitry 304 maintains a necessary amount of energy in energy storage 308, unless circuitry of load 310—such as a SoC, a CPU, or the like—goes into a sufficiently low power mode, and it is determined (according to some predefined criteria) that power usage by system load 310 is unlikely to spike to a level sufficient to transition the system voltage below the minimum system requirements.

In some embodiments, switch circuitry 312 is used to decouple port 302 from other circuitry of system 300 (for example, from charger circuitry 304 and energy storage 308) when no power supply is connected to port 302. For example, switch circuitry 312 includes one or more pass FETs (or power FETs) that are operated—e.g., by controller 320—when an external PPS (such as a power adapter, a docking station or other device which operates as a Type C USB Power Delivery power supply) is coupled to port 302 to provide power to system load 310. In some embodiments, energy storage 308 is partially discharged to battery 306 when a PPS is coupled to port 302. In some embodiments, energy storage 308 is discharged in response to a PPS being connected to port 302 but prior to PPS providing power to system load 310 through port 302.

In some embodiments, switch circuitry 350 is used to bypass charger circuitry 304 in some situations where a PPS is connected to port 302. For example, switch circuitry 350 includes one or more pass FETs (or power FETs) that are operated—e.g., by controller 320—to switchedly provide a conductive path between nodes 330, 332 when a voltage provided by a PPS is sufficiently close to a voltage which battery 306 provides at node 332.

In some embodiments, controller 320 is coupled to and controls components of the power delivery system to determine when a PPS is to supplement the power provided by battery 306 to system load 310, to charge and/or discharge energy storage 308, as well as to couple and/or decouple components of system 300 at specific times. For example, in some embodiments, controller 320 provides one or more control signals (e.g., including the illustrative control signals 324, 326, 328 shown) to variously operate switch circuitry 312, switch circuitry 350 and/or one or more switches of charger circuitry 304. In one such embodiment, controller 320 further communicates signals 322 via port 302 to negotiate a delivery of power with a PPS (e.g., wherein controller 320 provides functionality of control circuitry 140).

In some embodiments, energy storage 308 (or a portion of energy storage 308) is switchedly decoupled from other circuitry of system 300—e.g., with selective operation of switch circuitry 312 and/or one or more switches of charger circuitry 304—in order to minimize leakage of energy storage 308 and/or to prevent a full discharge of energy storage 308 while a device is connected at port 302 and switch circuitry 312 is turned on.

Although battery 306 is shown as being directly coupled to node 332, in other embodiments, system 300 further comprises other switch circuitry—e.g., including one or more pass FETs (or power FETs)—which is coupled between battery 306 and node 332. In one such embodiment, this other switch circuitry provides for battery 306 to be switchedly decoupled during a delivery of power by charger circuitry 304 to load 310—e.g., where such power is provided with energy storage 308 and/or with a PPS that is coupled to port 302.

In some embodiments, when a PPS is connected to port 302, switch circuitry 312 is configured in an on (closed circuit) state, and the voltage of energy storage 308 (at node 330) is the same as the input voltage at port 302. Charger circuitry 304 and/or switch circuitry 350 is then operated, based on one or both of control signals 322, 326, to selectively supplement (or forego supplementing) battery 306 with the PPS in a delivery of power to load 310. Alternatively or in addition, when there is no PPS coupled to the port 302, switch circuitry 312 is turned off, and charger circuitry 304 is operated to selectively supplement battery 306 with energy storage 308 in the delivery of power to load 310.

In some embodiments, controller 320 participates in, or otherwise facilitates, communications to negotiate a level of a voltage that the PPS is to provide via port 302, wherein said level is determined based on a mode of operation by load 310 and, in some embodiments, also on a VR mode which is to be provided with regulator circuitry including some or all of charger circuitry 304, switch circuitry 312, and switch circuitry 350. In one such embodiment, operations such as those of method 200 are performed to determine said voltage level e.g., wherein input port 302 and node 332 are (respectively) the port and the first node in method 200.

By way of illustration and not limitation, monitor 340 receives an indication (such as the illustrative signal 342 shown) that load 310 is to transition to a particular operational mode. Furthermore, monitor 340 detects an amount of charge which is currently stored at battery 306—e.g., by sampling the voltage at node 332. Based on signal 342 and the detected amount of charge, monitor 340 signals controller 320 to identify a voltage level to be output by the PPS, and a VR mode to be provided with some or all of charger circuitry 304, switch circuitry 312, and switch circuitry 350.

In the example embodiment shown, controller 320 comprises or otherwise has access to reference information (such as that provided by the illustrative tables 360, 370 shown) which specifies or otherwise indicates a correspondence of various operational modes of load 310 each with a respective one or more characteristics of power delivery to load 310. For example, table 360 identifies different operational modes OMa, OMb, . . . , OMn of load 310 as variously corresponding each to a respective one of different power delivery policies PDP1, PDP2, . . . , PDPx. Furthermore, table 370 identifies, for each of different power delivery policies PDP1, PDP2, . . . , PDPx, a respective one or more characteristics of power delivery to be provided according to said power delivery policy.

By way of illustration and not limitation, power delivery policy PDP1 comprises providing a voltage regulation mode VRM1, to facilitate a minimum voltage level v1_1 being provided at node 332. Table 370 also indicates that VRM1 is expected to result in a particular amount of power loss, for voltage level v1_1, by regulator circuitry which (in this example) includes charger circuitry 304. Furthermore, power delivery policy PDP2 comprises providing a voltage regulation mode VRM2, to facilitate a minimum voltage level v1_2 being provided at node 332. Table 370 also indicates that VRM2 is expected to result in a particular amount of power loss, for voltage level v1_2, by the regulator circuitry. Further still, power delivery policy PDPx comprises providing a voltage regulation mode VRMx, to facilitate a minimum voltage level v1_x being provided at node 332. Table 370 also indicates that VRMx is expected to result in a particular amount of power loss, for voltage level v1_x, by the regulator circuitry.

Table 1 below illustrates various power delivery policies to determine the configuring of a programmable power supply according to one embodiment.

TABLE 1

Example of Power Delivery Policies

| Power Delivery Policy | VR Mode | Required Load Power | Power Loss toward Battery Charging | PPS Output Voltage | Charge Rate |
|---|---|---|---|---|---|
| Best Performance | Pass-through | 8.8 V @ 2.5 A | 8.8 V @ 2.5 A | 8.8 V @ 5 A | ~0.41 C for 50 W, ~0.35 C for 60 W |
| Better Performance | Pass-through | 8.8 V @ 2 A | 8.8 V @ 3 A | 8.8 V @ 5 A | ~0.5 C for 50 W, ~0.42 C for 60 W |
| Better Charging | Buck | 8.8 V @ 1.5 A | 8.8 V @ 4.5 A | 12 V @ 5 A | ~0.75 C for 50 W, ~0.63 C for 60 W |
| Best Charging | Buck | 8.8 V @ 0.5 A | 8.8 V @ 7.2 A | 15 V @ 5 A | ~1 C for 50 W, ~1 C for 60 W |

However, the particular PDPs shown above in Table 1 are merely illustrative, and other embodiments variously program a PPS based on more, fewer or different PDPs, as appropriate for any of various implementation-specific details.

In response to monitor 340, and based on tables 360, 370, controller 320 participates in communications (e.g., using signal 322) to negotiate a voltage level which the PPS is to output for a delivery of power to port 302. Furthermore, controller 320 variously operates some or all of charger circuitry 304, switch circuitry 312, and switch circuitry 350 with control signals 324, 326, 328 to configure a mode of voltage regulation (such as one of a bypass mode, a pass-through mode, a buck mode, a boost mode, or a buck-boost mode) for delivering power to load 310 via node 332.

Figure 4:
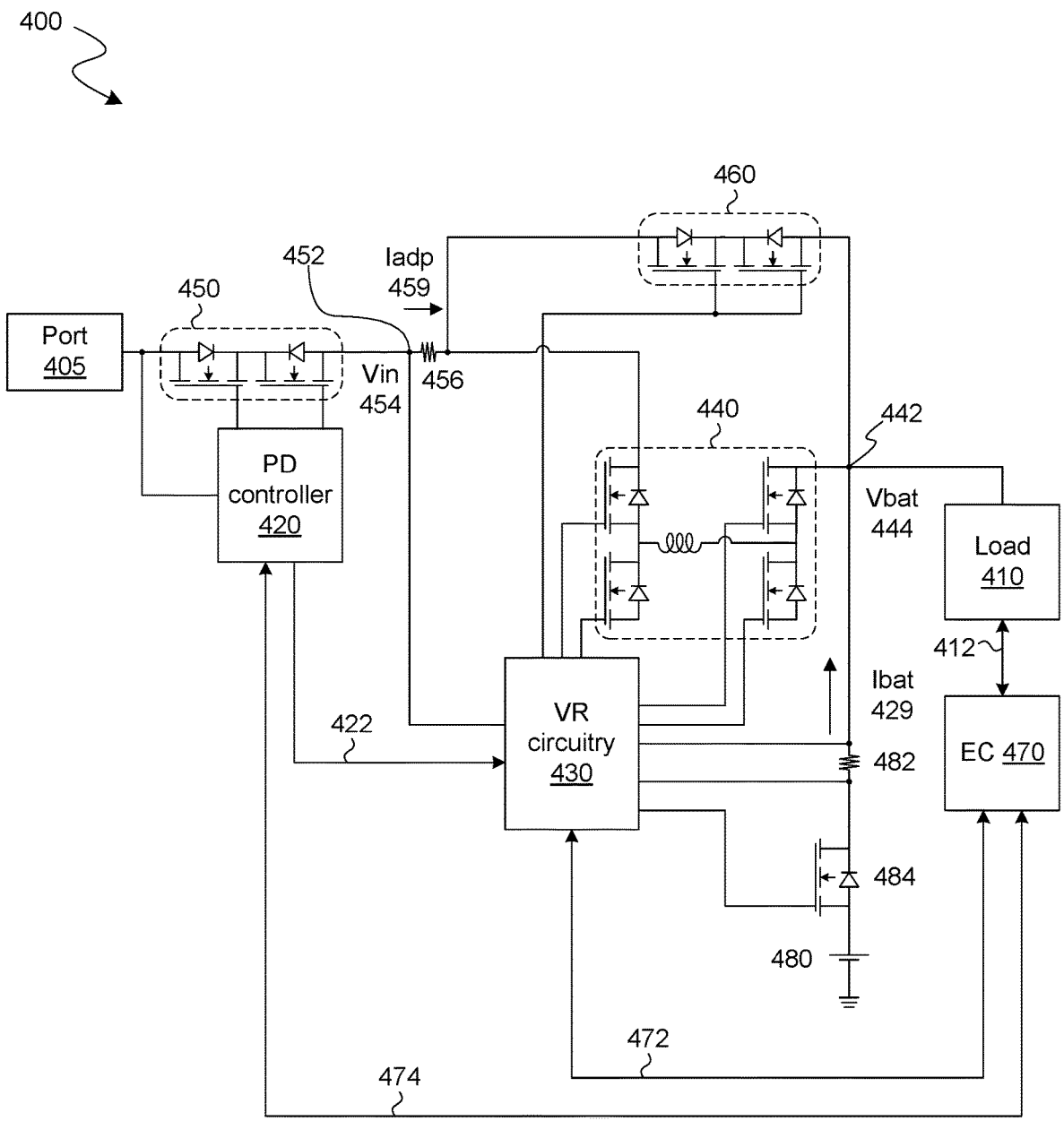
FIG. 4 illustrates a functional block diagram showing features of a system to configure a programmable power supply according to an embodiment.

FIG. 4 illustrates a device 400 to selectively program a PPS and regulate power delivery to a load according to an embodiment. Device 400 is one example of hardware which provides functionality such as that of device 130 or system 300—e.g., wherein device 400 is operable to perform some or all of method 200.

As shown in FIG. 4, device 400 comprises a port 405, one or more load components 410, and a battery 480 which correspond functionally to port 302, load 310, and battery 306 (respectively). Voltage regulator (VR) circuitry 430 and converter circuit 440 of device 400 operate together to provide functionality of charger circuitry 304, for example. In the example embodiment shown, device 400 further comprises an embedded controller EC 470 and a power delivery controller 420 which operate to provide functionality of controller 320 (and in some embodiments, functionality of monitor 340, for example). Switch circuitry 450 and switch circuitry 460 of device 400 provide functionality such as that of switch circuitry 312 and switch circuitry 350 (respectively).

In the example embodiment shown, switch circuitry 450 and switch circuitry 460 each comprises a respective one or more pass field effect transistors and/power FETs. Furthermore, converter circuit 440 comprises four power field effect transistors (such as pass FETs or power FETs) and an inductor. In some embodiments, although the FETs within converter circuit 440 are illustrated the same as FETs of switch circuitry 450 and switch circuitry 460, it is noted that in some embodiments, various FETs illustrated in FIG. 4 are different.

The switch circuitry 450 is coupled between a node 452 and the port 405. An output terminal of the battery 480 is referred to as node 442. The battery 480 is coupled between the node 442 and a ground terminal. In some embodiments, the switch circuitry 460, when switched on, electrically couples the nodes 452 and 442. In an example, the switch circuitry 460 is controlled by the VR circuitry 430 (or by another appropriate component of the device 400, such as a power delivery controller 420).

In some embodiments, one or more load components 410 are coupled between the battery output node 442 and the ground terminal. Device 400 facilitates the load components 410 receiving a regulated voltage Vbat 444 at node 442. In one such embodiment, device 400 further comprises switch circuitry 484 (and/or other voltage regulator circuitry, for example) which is coupled between node 442 and battery 480, to selectively provide voltage Vbat 444 with battery 480—e.g., via the illustrative measurement circuitry 482 shown.

In some embodiments, the device 400 comprises measurement circuitry 456 to measure a voltage and/or a current of the node 452. In some embodiments, the device 400 comprises measurement circuitry 482 (also referred to as circuitry 482) to measure a voltage and/or a current output by the battery 480. Circuitries 45 and 482 are coupled to VR circuitry 430 (or alternatively, to PD controller 420) to facilitate the determining of operations by converter circuit 440 (and/or other circuitry of device 400) to regulate power delivery to the one or more load components 410 via node 442. Any appropriate measurement techniques are used in various embodiments for the circuitry 456 and/or 482. Merely as an example, to measure a voltage, individual ones of the circuitries 456, 482 comprise a corresponding resistor, wherein VR circuitry 430 measures one or more voltage drops each across a respective one of the resistors—e.g., to estimate the current Ibat 429, current Iadp 459 and/or the like.

In some embodiments, the power delivery (PD) controller 420 (also referred to as controller 420) controls switching of the switch circuitry 450 (and, in some embodiments, switch circuitry 460). For example, the PD controller 420 is associated with the port 405, which is a USB port. For example, the controller 420 communicates with the port 405, e.g., via one or more configuration channel (CC) signal lines between the port 405 and the controller 420. When an external component (e.g., a PPS) is attached to the port 405, the controller 420 communicates configuration data with the component via the CC signal lines. The controller 420 is thus made aware of a type of the component coupled to the port 405, a configuration of the component, a voltage capability of the component, etc. via the CC signal lines. The controller 420 negotiates power delivery between the external component and the device 400 based on, for example, an appropriate power delivery protocol (e.g., an USB power delivery protocol). When, for example, power delivery between the device 400 and the external component is negotiated and allowed, the controller 420 switches on the switch circuitry 450.

In some embodiments, when the PPS is coupled to the device 400, the switch circuitry 450 is selectively switched on. For example, the PPS has a voltage capability (e.g., an ability to output a particular voltage level to device 400), and a current amount of charge at battery 480 of the device 400 enables a particular level of Vbat 444. If the voltage capability of the PPS substantially matches said level of Vbat 444, then the switch circuitry 460 is selectively ON, in response to the PPS implementing said voltage capability.

However, if the PPS voltage capability and Vbat 444 differ (e.g., the PPS cannot sufficiently match the current level of Vbat 444), then switch circuitry 460 and/or converter circuit 440 are operated to accommodate the difference. For example, if Vbat 444 and a closest one of various PPS voltage capabilities differ by at least some predetermined threshold amount, the switch circuitry 460 is switched off (e.g., by the VR circuitry 430). Otherwise, power delivery controller 420 signals internal control circuitry of the PPS to either step-up or step-down the voltage based on a current amount of charge (e.g., and/or a current voltage level) of the battery 480.

In some embodiments, once an external component (e.g., a PPS) is coupled to the port 405, the PD controller 420 determines a type of the external component. The PD controller 420 also determines a voltage capability of the external component. Based on determining the type and/or the voltage capability, the PD controller 420 instructs the VR circuitry 430 on switching on or off the switch circuitry 460. For example, if a PPS (e.g., an AC adapter of docking station) is coupled to the port 405, then in many situations, the voltage output of the PPS is substantially higher than the voltage of the battery 480. For example, in a typical scenario, the battery 480 operates at about 5 V, while the voltage Vin 454 at the node 452 from the PPS is 20 V.

To prevent battery 480 and the load 410 being exposed to the higher PPS voltage, the PD controller 420 instructs the VR circuitry 430 to turn off the switch circuitry 460, based on which the VR circuitry 430 turns the switch circuitry 460 off. In another example, the PD controller 420 transmits to the VR circuitry 430 a type of the external component coupled to the port 405, a voltage capability of the external component, etc., based on which the VR circuitry 430 decides on its own to turn off the switch circuitry 460. In yet another example and unlike the illustration of FIG. 1, the PD controller 420 controls the switch circuitry 460 and turn off the switch circuitry 460.

In some embodiments, the voltage Vin 454 of the node 452 is supplied to the converter circuit 440. For example, if the PPS is coupled to the port 405 and is to supply power to the device 400 (e.g., as negotiated by the controller 420), the switch circuitry 450 is turned on, and the voltage Vin 454 is supplied to the converter circuit 440. The converter circuit 440 regulates the voltage level of the power from the PPS to the voltage level of the battery (e.g., Vbat 444), which the converter circuit 440 supplies to the node 442. In some examples, one or each of switch circuitry 450 and switch circuitry 460 are implemented with back-to-back FET to prevent unintentional leakage (e.g., due to body diodes arranged in an opposing manner). However, any of a variety of single FET and/or other switch circuit implementations are variously provided in different embodiments.

In various embodiments, functionality of control circuitry 140 (including that of monitor 340 and/or controller 320) is variously distributed among some or all of power delivery controller 420, VR circuitry 430, and EC 470. For example, EC 470 is coupled (via the illustrative interconnect 412 shown) to monitor operations of one or more load components 410 and to detect whether a transition of one or more load components 410 to a given operational mode has taken place or is expected to take place. In one such embodiment, EC 470 is further coupled to monitor one or more indicia (e.g., including voltage Vbat 444) of an amount of charge which is currently stored at battery 480.

Based on indicated operational mode and the amount of stored charge, signals are variously communicated with EC 470, power delivery controller 420, and VR circuitry 430 to request that the PPS output a voltage to port 405 at a corresponding level, and to configure a VR mode with some or all of converter circuit 440, switch circuitry 450, switch circuitry 460, and switch circuitry 484.

By way of illustration and not limitation, channels 472, 474 with VR circuitry 430, and power delivery controller 420 (respectively) enable EC 470 to specify or otherwise communicate one or more power requirements of the detected operational mode. Based on said one or more power requirements, power delivery controller 420 participates in communications via port 405 to negotiate a level of a voltage that the PPS is to output to device 400. Furthermore, VR circuitry 430 variously operates switch circuitry 460, switch circuitry 484 and/or one or more switches of converter circuit 440 to regulate a delivery of a voltage to node 442 (and, for example, to battery 480).

In one example embodiment, power delivery controller 420 indicates to VR circuitry 430 (e.g., via the illustrative control signal 422 shown) when the PPS is outputting the requested voltage level to port 405. In one such embodiment, some or all control signaling to provide the VR mode in question (e.g., the control signaling by VR circuitry 430 to operate switch circuitry 460, switch circuitry 484 and/or one or more switches of converter circuit 440) is in response to said indicating via control signal 422.

Figure 5:
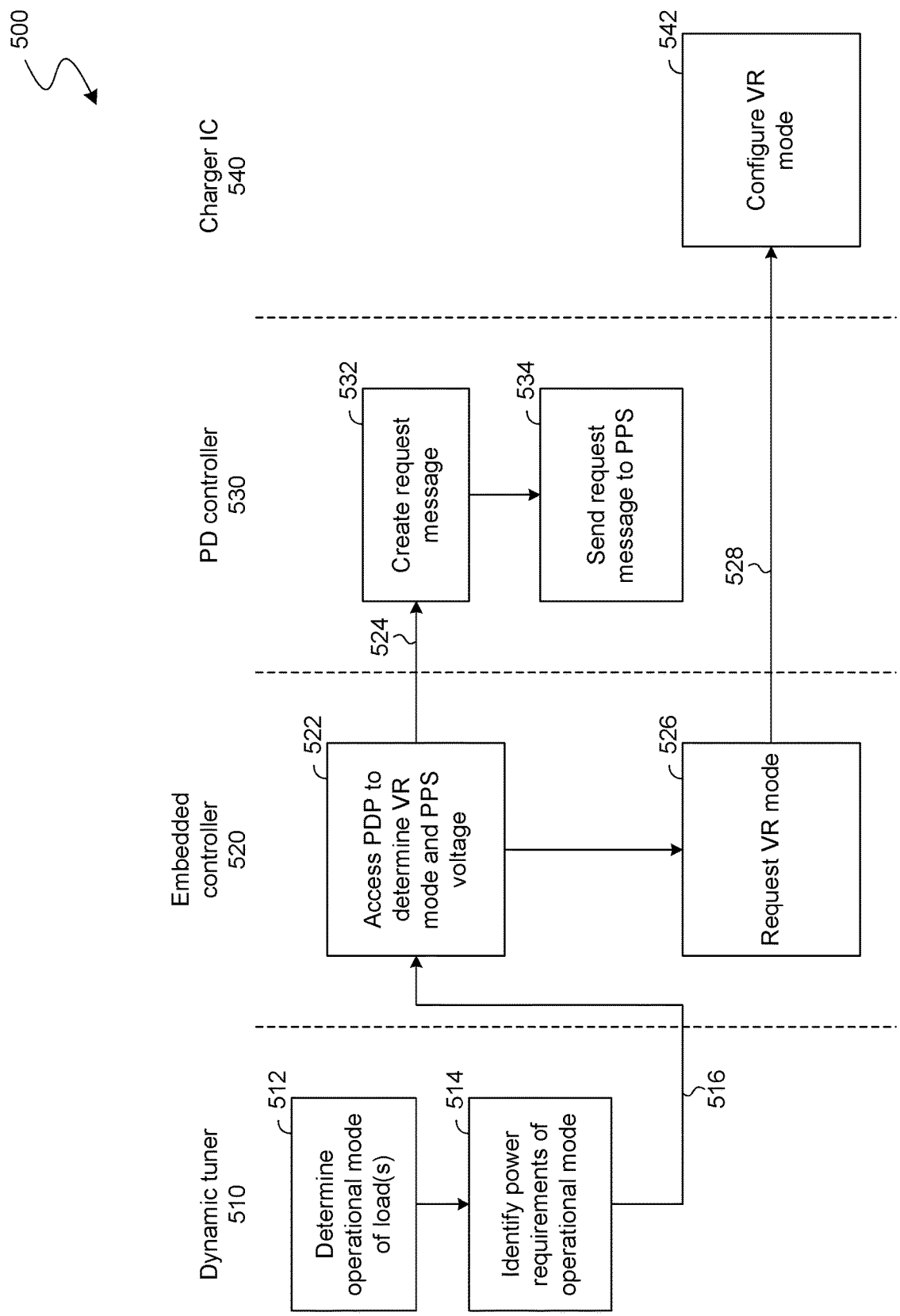
FIG. 5 illustrates a sequence diagram showing operations to determine a provisioning of a voltage with a programmable power supply according to an embodiment.

FIG. 5 shows a sequence diagram 500 which illustrates various communications and other operations to determine a delivery of power with a programmable power supply according to an embodiment. Operations such as those shown in sequence diagram 500 are performed, for example, with device 130, system 300, or device 400—e.g., wherein method 200 includes or is otherwise based on some or all such operations.

As shown in FIG. 5, sequence diagram 500 illustrates communications between a dynamic tuner 510, an embedded controller 520, a PD controller 530, and a charger IC 540. For example, dynamic tuner 510 provides functionality—such as that of an Intel® Dynamic Tuning Technology (or other suitable technology)—to selectively implement user-defined configurations of resources for various operational modes. In one such embodiment, dynamic tuner 510 is provided with circuit structures of (and/or software executed with) one or more load components 410—e.g., wherein embedded controller 520, PD controller 530, and charger IC 540 correspond functionally to EC 470, power delivery controller 420, and VR circuitry 430 (respectively).

In the example embodiment shown, dynamic tuner 510 determines (at 512) a current or expected next operational mode of one or more load components. Based on the operational mode in question, dynamic tuner 510 (at 514) identifies one or more power requirements of the operational mode. For example, dynamic tuner 510 accesses reference information which identifies respective minimum power consumption thresholds of various load components. Subsequently, dynamic tuner 510 sends to embedded controller 520 a message 516 which indicates the one or more power requirements which were identified at 514.

Based on message 516, embedded controller 520 accesses some predetermined reference information—referred to in sequence diagram 500 as a "charger profile"—which identifies a power delivery plan to accommodate the indicated one or more power requirements. In one such embodiment, the power delivery plan is selected from among a plurality of such power delivery plans—e.g., where the selection is based on the one or more power requirements and (for example) an amount of charge which is currently stored at one or more batteries which are available to support the one or more load components. Based on the selected PDP, embedded controller 520 (at 522) determines an output voltage level to request of a PPS, and a mode of voltage regulation by charger IC 540 (e.g., by regulator/charger 136). The output voltage level is determined, for example, based on a power loss by charger IC 540 which is associated with the VR mode.

In one such embodiment, embedded controller 520 sends to PD controller 530 a message 524 to indicate the determined voltage level, whereupon PD controller 530 generates (at 532) and sends (at 534) a communication to negotiate the voltage level to be output by the PPS. Furthermore, embedded controller 520 (at 526) generates a message 528 which indicates the VR mode to charger IC 540. Based on message 528, charger IC 540 (at 542) configures the VR mode which is indicated by the selected PDP—e.g., wherein the VR mode is one of a pass-through mode, a buck mode, a boost mode, or a combination of such modes. In some embodiments, charger IC 540 is configured to bypass a buck-boost converter (or other such converter circuitry) and/or to selectively enable or disable charging of the battery while power is delivered to the one or more load components.

Figure 6:
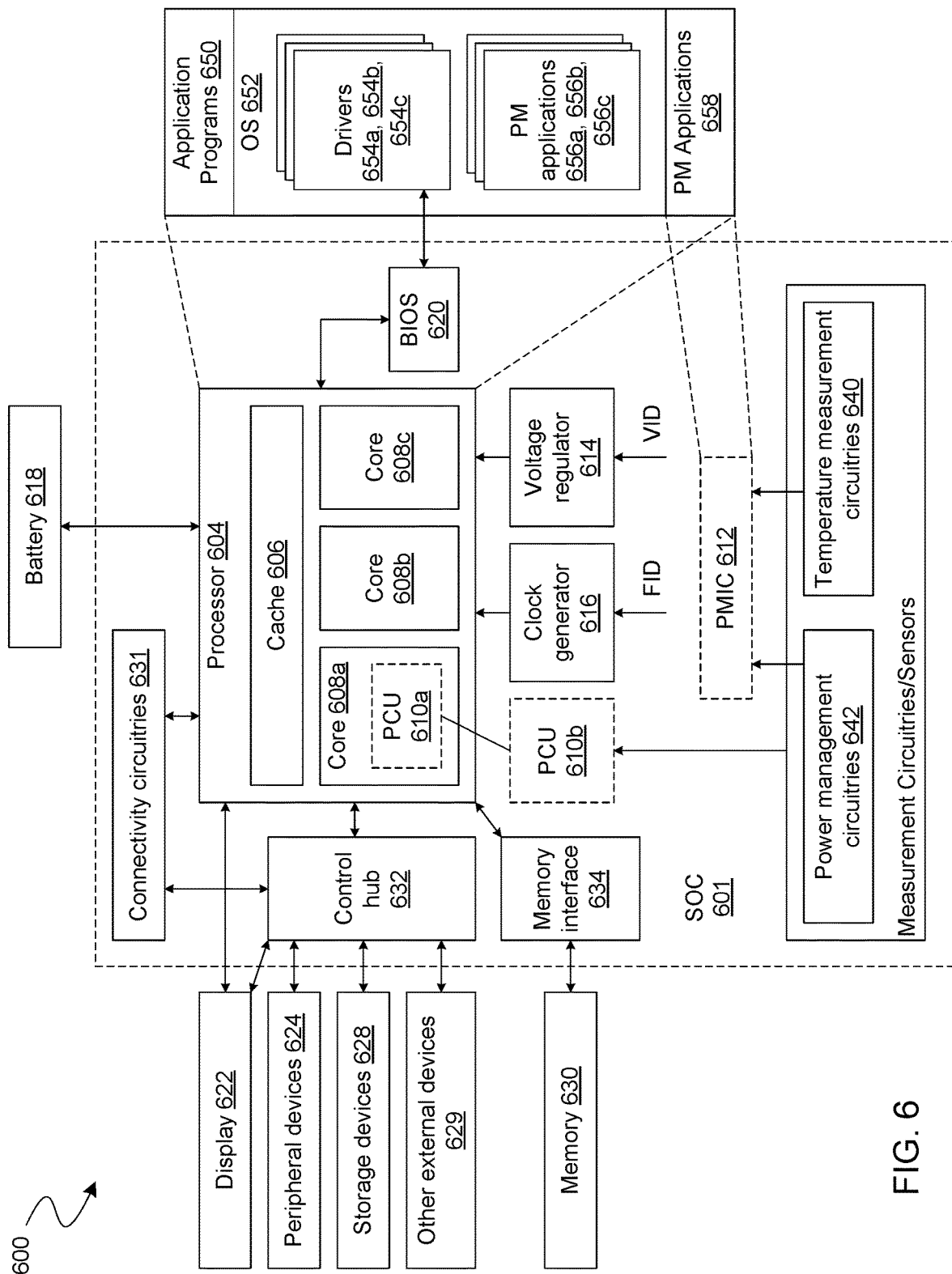
FIG. 6 illustrates a functional block diagram showing features of a computer device to operate based on a voltage from a programmable power supply according to an embodiment.

FIG. 6 illustrates a computer system or computing device 600 (also referred to as device 600) which facilitates configuration of a programmable power supply in accordance with some embodiments. It is pointed out that those elements of FIG. 6 having the same reference numbers (or names) as the elements of any other figure can operate or function in any manner similar to that described, but are not limited to such.

In some embodiments, device 600 represents an appropriate computing device, such as a computing tablet, a mobile phone or smart-phone, a laptop, a desktop, an Internet-of-Things (IOT) device, a server, a wearable device, a set-top box, a wireless-enabled e-reader, or the like. It will be understood that certain components are shown generally, and not all components of such a device are shown in device 600.

In an example, the device 600 comprises a SoC (System-on-Chip) 601. An example boundary of the SOC 601 is illustrated using dotted lines in FIG. 6, with some example components being illustrated to be included within SOC 601—however, SOC 601 may include any appropriate components of device 600.

In some embodiments, device 600 includes processor 604. Processor 604 can include one or more physical devices, such as microprocessors, application processors, microcontrollers, programmable logic devices, processing cores, or other processing means. The processing operations performed by processor 604 include the execution of an operating platform or operating system on which applications and/or device functions are executed. The processing operations include operations related to I/O (input/output) with a human user or with other devices, operations related to power management, operations related to connecting computing device 600 to another device, and/or the like. The processing operations may also include operations related to audio I/O and/or display I/O.

In some embodiments, processor 604 includes multiple processing cores (also referred to as cores) 608a, 608b, 608c. Although merely three cores 608a, 608b, 608c are illustrated in FIG. 6, the processor 604 may include any other appropriate number of processing cores, e.g., tens, or even hundreds of processing cores. Processor cores 608a, 608b, 608c may be implemented on a single integrated circuit (IC) chip. Moreover, the chip may include one or more shared and/or private caches, buses or interconnections, graphics and/or memory controllers, or other components.

In some embodiments, processor 604 includes cache 606. In an example, sections of cache 606 may be dedicated to individual cores 608 (e.g., a first section of cache 606 dedicated to core 608a, a second section of cache 606 dedicated to core 608b, and so on). In an example, one or more sections of cache 606 may be shared among two or more of cores 608. Cache 606 may be split in different levels, e.g., level 1 (L1) cache, level 2 (L2) cache, level 3 (L3) cache, etc.

In some embodiments, processor core 604 may include a fetch unit to fetch instructions (including instructions with conditional branches) for execution by the core 604. The instructions may be fetched from any storage devices such as the memory 630. Processor core 604 may also include a decode unit to decode the fetched instruction. For example, the decode unit may decode the fetched instruction into a plurality of micro-operations. Processor core 604 may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.). The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, an execution unit may execute instructions out-of-order. Hence, processor core 604 may be an out-of-order processor core in one embodiment. Processor core 604 may also include a retirement unit. The retirement unit may retire executed instructions after they are committed. In an embodiment, retirement of the executed instructions may result in processor state being committed from the execution of the instructions, physical registers used by the instructions being de-allocated, etc. The processor core 604 may also include a bus unit to enable communication between components of the processor core 604 and other components via one or more buses. Processor core 604 may also include one or more registers to store data accessed by various components of the core 604 (such as values related to assigned app priorities and/or sub-system states (modes) association.

In some embodiments, device 600 comprises connectivity circuitries 631. For example, connectivity circuitries 631 includes hardware devices (e.g., wireless and/or wired connectors and communication hardware) and/or software components (e.g., drivers, protocol stacks), e.g., to enable device 600 to communicate with external devices. Device 600 may be separate from the external devices, such as other computing devices, wireless access points or base stations, etc.

In an example, connectivity circuitries 631 may include multiple different types of connectivity. To generalize, the connectivity circuitries 631 may include cellular connectivity circuitries, wireless connectivity circuitries, etc. Cellular connectivity circuitries of connectivity circuitries 631 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 631 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 631 may include a network interface, such as a wired or wireless interface, e.g., so that a system embodiment may be incorporated into a wireless device, for example, cell phone or personal digital assistant.

In some embodiments, device 600 comprises control hub 632, which represents hardware devices and/or software components related to interaction with one or more I/O devices. For example, processor 604 may communicate with one or more of display 622, one or more peripheral devices 624, storage devices 628, one or more other external devices 629, etc., via control hub 632. Control hub 632 may be a chipset, a Platform Control Hub (PCH), and/or the like.

For example, control hub 632 illustrates one or more connection points for additional devices that connect to device 600, e.g., through which a user might interact with the system. For example, devices (e.g., devices 629) that can be attached to device 600 include microphone devices, speaker or stereo systems, audio devices, video systems or other display devices, keyboard or keypad devices, or other I/O devices for use with specific applications such as card readers or other devices.

As mentioned above, control hub 632 can interact with audio devices, display 622, etc. For example, input through a microphone or other audio device can provide input or commands for one or more applications or functions of device 600. Additionally, audio output can be provided instead of, or in addition to display output. In another example, if display 622 includes a touch screen, display 622 also acts as an input device, which can be at least partially managed by control hub 632. There can also be additional buttons or switches on computing device 600 to provide I/O functions managed by control hub 632. In one embodiment, control hub 632 manages devices such as accelerometers, cameras, light sensors or other environmental sensors, or other hardware that can be included in device 600. The input can be part of direct user interaction, as well as providing environmental input to the system to influence its operations (such as filtering for noise, adjusting displays for brightness detection, applying a flash for a camera, or other features).

In some embodiments, control hub 632 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 622 represents hardware (e.g., display devices) and software (e.g., drivers) components that provide a visual and/or tactile display for a user to interact with device 600. Display 622 may include a display interface, a display screen, and/or hardware device used to provide a display to a user. In some embodiments, display 622 includes a touch screen (or touch pad) device that provides both output and input to a user. In an example, display 622 may communicate directly with the processor 604. Display 622 can be one or more of an internal display device, as in a mobile electronic device or a laptop device or an external display device attached via a display interface (e.g., DisplayPort, etc.). In one embodiment display 622 can be a head mounted display (HMD) such as a stereoscopic display device for use in virtual reality (VR) applications or augmented reality (AR) applications.

In some embodiments and although not illustrated in the figure, in addition to (or instead of) processor 604, device 600 may include Graphics Processing Unit (GPU) comprising one or more graphics processing cores, which may control one or more aspects of displaying contents on display 622.

Control hub 632 (or platform controller hub) may include hardware interfaces and connectors, as well as software components (e.g., drivers, protocol stacks) to make peripheral connections, e.g., to peripheral devices 624.

It will be understood that device 600 could both be a peripheral device to other computing devices, as well as have peripheral devices connected to it. Device 600 may have a "docking" connector to connect to other computing devices for purposes such as managing (e.g., downloading and/or uploading, changing, synchronizing) content on device 600. Additionally, a docking connector can allow device 600 to connect to certain peripherals that allow computing device 600 to control content output, for example, to audiovisual or other systems.

In addition to a proprietary docking connector or other proprietary connection hardware, device 600 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 631 may be coupled to control hub 632, e.g., in addition to, or instead of, being coupled directly to the processor 604. In some embodiments, display 622 may be coupled to control hub 632, e.g., in addition to, or instead of, being coupled directly to processor 604.

In some embodiments, device 600 comprises memory 630 coupled to processor 604 via memory interface 634. Memory 630 includes memory devices for storing information in device 600. Memory can include nonvolatile (state does not change if power to the memory device is interrupted) and/or volatile (state is indeterminate if power to the memory device is interrupted) memory devices. Memory device 630 can be a dynamic random access memory (DRAM) device, a static random access memory (SRAM) device, flash memory device, phase-change memory device, or some other memory device having suitable performance to serve as process memory. In one embodiment, memory 630 can operate as system memory for device 600, to store data and instructions for use when the one or more processors 604 executes an application or process. Memory 630 can store application data, user data, music, photos, documents, or other data, as well as system data (whether long-term or temporary) related to the execution of the applications and functions of device 600.

Elements of various embodiments and examples are also provided as a machine-readable medium (e.g., memory 630) for storing the computer-executable instructions (e.g., instructions to implement any other processes discussed herein). The machine-readable medium (e.g., memory 630) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 600 comprises temperature measurement circuitries 640, e.g., for measuring temperature of various components of device 600. In an example, temperature measurement circuitries 640 may be embedded, or coupled or attached to various components, whose temperature are to be measured and monitored. For example, temperature measurement circuitries 640 may measure temperature of (or within) one or more of cores 608a, 608b, 608c, voltage regulator 614, memory 630, a mother-board of SOC 601, and/or any appropriate component of device 600.

In some embodiments, device 600 comprises power measurement circuitries 642, e.g., for measuring power consumed by one or more components of the device 600. In an example, in addition to, or instead of, measuring power, the power measurement circuitries 642 may measure voltage and/or current. In an example, the power measurement circuitries 642 may be embedded, or coupled or attached to various components, whose power, voltage, and/or current consumption are to be measured and monitored. For example, power measurement circuitries 642 may measure power, current and/or voltage supplied by one or more voltage regulators 614, power supplied to SOC 601, power supplied to device 600, power consumed by processor 604 (or any other component) of device 600, etc.

In some embodiments, device 600 comprises one or more voltage regulator circuitries, generally referred to as voltage regulator (VR) 614. VR 614 generates signals at appropriate voltage levels, which may be supplied to operate any appropriate components of the device 600. Merely as an example, VR 614 is illustrated to be supplying signals to processor 604 of device 600. In some embodiments, VR 614 receives one or more Voltage Identification (VID) signals, and generates the voltage signal at an appropriate level, based on the VID signals. Various type of VRs may be utilized for the VR 614. For example, VR 614 may include a "buck" VR, "boost" VR, a combination of buck and boost VRs, low dropout (LDO) regulators, switching DC-DC regulators, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR which is controlled by PCU 610*a/b* and/or PMIC 612. In some embodiments, each core has a network of distributed LDOs to provide efficient control for power management. The LDOs can be digital, analog, or a combination of digital or analog LDOs.

In some embodiments, device 600 comprises one or more clock generator circuitries, generally referred to as clock generator 616. Clock generator 616 generates clock signals at appropriate frequency levels, which may be supplied to any appropriate components of device 600. Merely as an example, clock generator 616 is illustrated to be supplying clock signals to processor 604 of device 600. In some embodiments, clock generator 616 receives one or more Frequency Identification (FID) signals, and generates the clock signals at an appropriate frequency, based on the FID signals.

In some embodiments, device 600 comprises battery 618 supplying power to various components of device 600. Merely as an example, battery 618 is illustrated to be supplying power to processor 604. Although not illustrated in the figures, device 600 may comprise a charging circuitry, e.g., to recharge the battery, based on Alternating Current (AC) power supply received from an AC adapter.

In some embodiments, device 600 comprises Power Control Unit (PCU) 610 (also referred to as Power Management Unit (PMU), Power Controller, etc.). In an example, some sections of PCU 610 may be implemented by one or more processing cores 608, and these sections of PCU 610 are symbolically illustrated using a dotted box and labelled PCU 610*a*. In an example, some other sections of PCU 610 may be implemented outside the processing cores 608, and these sections of PCU 610 are symbolically illustrated using a dotted box and labelled as PCU 610*b*. PCU 610 may implement various power management operations for device 600. PCU 610 may include hardware interfaces, hardware circuitries, connectors, registers, etc., as well as software components (e.g., drivers, protocol stacks), to implement various power management operations for device 600.

In some embodiments, device 600 comprises Power Management Integrated Circuit (PMIC) 612, e.g., to implement various power management operations for device 600. In some embodiments, PMIC 612 is a Reconfigurable Power Management ICs (RPMICs) and/or an IMVP (Intel® Mobile Voltage Positioning). In an example, the PMIC is within an IC chip separate from processor 604. The may implement various power management operations for device 600. PMIC 612 may include hardware interfaces, hardware circuitries, connectors, registers, etc., as well as software components (e.g., drivers, protocol stacks), to implement various power management operations for device 600.

In an example, device 600 comprises one or both PCU 610 or PMIC 612. In an example, any one of PCU 610 or PMIC 612 may be absent in device 600, and hence, these components are illustrated using dotted lines.

Various power management operations of device 600 may be performed by PCU 610, by PMIC 612, or by a combination of PCU 610 and PMIC 612. For example, PCU 610 and/or PMIC 612 may select a power state (e.g., P-state) for various components of device 600. For example, PCU 610 and/or PMIC 612 may select a power state (e.g., in accordance with the ACPI (Advanced Configuration and Power Interface) specification) for various components of device 600. Merely as an example, PCU 610 and/or PMIC 612 may cause various components of the device 600 to transition to a sleep state, to an active state, to an appropriate C state (e.g., C0 state, or another appropriate C state, in accordance with the ACPI specification), etc. In an example, PCU 610 and/or PMIC 612 may control a voltage output by VR 614 and/or a frequency of a clock signal output by the clock generator, e.g., by outputting the VID signal and/or the FID signal, respectively. In an example, PCU 610 and/or PMIC 612 may control battery power usage, charging of battery 618, and features related to power saving operation.

The clock generator 616 can comprise a phase locked loop (PLL), frequency locked loop (FLL), or any suitable clock source. In some embodiments, each core of processor 604 has its own clock source. As such, each core can operate at a frequency independent of the frequency of operation of the other core. In some embodiments, PCU 610 and/or PMIC 612 performs adaptive or dynamic frequency scaling or adjustment. For example, clock frequency of a processor core can be increased if the core is not operating at its maximum power consumption threshold or limit. In some embodiments, PCU 610 and/or PMIC 612 determines the operating condition of each core of a processor, and opportunistically adjusts frequency and/or power supply voltage of that core without the core clocking source (e.g., PLL of that core) losing lock when the PCU 610 and/or PMIC 612 determines that the core is operating below a target performance level. For example, if a core is drawing current from a power supply rail less than a total current allocated for that core or processor 604, then PCU 610 and/or PMIC 612 can temporarily increase the power draw for that core or processor 604 (e.g., by increasing clock frequency and/or power supply voltage level) so that the core or processor 604 can perform at a higher performance level. As such, voltage and/or frequency can be increased temporality for processor 604 without violating product reliability.

In an example, PCU 610 and/or PMIC 612 may perform power management operations, e.g., based at least in part on receiving measurements from power measurement circuitries 642, temperature measurement circuitries 640, charge level of battery 618, and/or any other appropriate information that may be used for power management. To that end, PMIC 612 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor(s) may be directly coupled to PCU 610 and/or PMIC 612 in at least one embodiment to allow PCU 610 and/or PMIC 612 to manage processor core energy at least in part based on value(s) detected by one or more of the sensors.

Also illustrated is an example software stack of device 600 (although not all elements of the software stack are illustrated). Merely as an example, processors 604 may execute application programs 650, Operating System 652, one or more Power Management (PM) specific application programs (e.g., generically referred to as PM applications 658), and/or the like. PM applications 658 may also be executed by the PCU 610 and/or PMIC 612. OS 652 may also include one or more PM applications 656*a*, 656*b*, 656*c*. The OS 652 may also include various drivers 654*a*, 654*b*, 654*c*, etc., some of which may be specific for power management purposes. In some embodiments, device 600 may further comprise a Basic Input/Output System (BIOS) 620. BIOS 620 may communicate with OS 652 (e.g., via one or more drivers 654), communicate with processors 604, etc.

For example, one or more of PM applications 658, 656, drivers 654, BIOS 620, etc. may be used to implement power management specific tasks, e.g., to control voltage and/or frequency of various components of device 600, to control wake-up state, sleep state, and/or any other appropriate power state of various components of device 600, control battery power usage, charging of the battery 618, features related to power saving operation, etc.

In various embodiment, device 600 supports coupling to a programmable power supply (not shown) and provides functionality to configure the programmable power supply in aid of dynamic performance tuning. Such functionality is provided, for example, with some or all of PMIC 612, power measurement circuitries 642, PM applications 656*a*-656*c*, 658, VR 614, PCU 610, battery 618, or connectivity circuitries 631.

In one or more first embodiments, a device comprises first circuitry to detect a transition of one or more loads to a first operational mode while a platform comprises the device, the one or more loads, a port, regulator circuitry coupled between the port and a first node, and a battery coupled to the one or more loads via the first node, second circuitry, coupled to the first circuitry, to receive an indication of an amount of charge stored by the battery, the second circuitry further to identify, based on the transition and the amount of charge a first voltage regulation (VR) mode of the regulator circuitry to provide a first level of a first voltage at the first node, wherein the first VR mode corresponds to a first power loss by the first circuitry, and a second level of a second voltage, wherein the second level is based on the first power loss, and third circuitry, coupled to the second circuitry, to signal that a programmable power supply is to provide the second voltage at the second level to deliver power to the platform via the port.

In one or more second embodiments, further to the first embodiment, the second circuitry to identify the second level of the second voltage comprises the second circuitry to determine an amount of power to be delivered by the programmable power supply based on a sum of a required level of power to be delivered from the first node, and an amount of the first power loss by the regulator circuitry.

In one or more third embodiments, further to the first embodiment or the second embodiment, the first operational mode comprises a combination of respective configurations of multiple loads comprising a central processing unit and a graphics processing unit, and wherein the second circuitry is to identify the first VR mode and the second voltage based on a thermal design point of the multiple loads.

In one or more fourth embodiments, further to any of the first through third embodiments, the device further comprises fourth circuitry, coupled to the second circuitry, to control the first VR mode of the regulator circuitry.

In one or more fifth embodiments, further to the fourth embodiment, the regulator circuitry comprises switch circuitry and a converter circuit coupled to the switch circuitry, and wherein the fourth circuitry to control the first VR mode of the regulator circuitry comprises the fourth circuitry to operate the switch circuitry to enable a conductive path which bypasses the converter circuit.

In one or more sixth embodiments, further to the fourth embodiment, the regulator circuitry comprises switch circuitry and a converter circuit coupled to the switch circuitry, and wherein the fourth circuitry to control the first VR mode of the regulator circuitry comprises the fourth circuitry to operate the switch circuitry to provide a conductive path between the port and the converter circuit.

In one or more seventh embodiments, further to the sixth embodiment, the fourth circuitry to control the first VR mode of the regulator circuitry comprises the fourth circuitry to control one of a buck mode of the converter circuit, or a boost mode of the converter circuit.

In one or more eighth embodiments, further to the fourth embodiment, the regulator circuitry comprises switch circuitry and a converter circuit coupled to the switch circuitry, and wherein the fourth circuitry to control the first VR mode of the regulator circuitry comprises the fourth circuitry to operate the switch circuitry to disable a conductive path between the battery and the first node.

In one or more ninth embodiments, further to any of the first through third embodiments, the third circuitry is to participate in communications with the programmable power supply via the port, wherein the communications are compatible with a Universal Serial Bus Power Delivery specification.

In one or more tenth embodiments, a system comprises a first device comprising first circuitry to detect a transition of one or more loads to a first operational mode while a platform comprises the first device, the one or more loads, a port, regulator circuitry coupled between the port and a first node, and a battery coupled to the one or more loads via the first node, second circuitry, coupled to the first circuitry, to receive an indication of an amount of charge stored by the battery, the second circuitry further to identify, based on the transition and the amount of charge a first voltage regulation (VR) mode of the regulator circuitry to provide a first level of a first voltage at the first node, wherein the first VR mode corresponds to a first power loss by the first circuitry, and a second level of a second voltage, wherein the second level is based on the first power loss, third circuitry, coupled to the second circuitry, to signal that a programmable power supply is to provide the second voltage at the second level to deliver power to the platform via the port. The system further comprises a display device coupled to the first device, the display device to display an image based on a signal communicated with the one or more loads.

In one or more eleventh embodiments, further to the tenth embodiment, the second circuitry to identify the second level of the second voltage comprises the second circuitry to determine an amount of power to be delivered by the programmable power supply based on a sum of a required level of power to be delivered from the first node, and an amount of the first power loss by the regulator circuitry.

In one or more twelfth embodiments, further to the tenth embodiment or the eleventh embodiment, the first operational mode comprises a combination of respective configurations of multiple loads comprising a central processing unit and a graphics processing unit, and wherein the second circuitry is to identify the first VR mode and the second voltage based on a thermal design point of the multiple loads.

In one or more thirteenth embodiments, further to any of the tenth through twelfth embodiments, the first device further comprises fourth circuitry, coupled to the second circuitry, to control the first VR mode of the regulator circuitry.

In one or more fourteenth embodiments, further to the thirteenth embodiment, the regulator circuitry comprises switch circuitry and a converter circuit coupled to the switch circuitry, and wherein the fourth circuitry to control the first VR mode of the regulator circuitry comprises the fourth circuitry to operate the switch circuitry to enable a conductive path which bypasses the converter circuit.

In one or more fifteenth embodiments, further to the thirteenth embodiment, the regulator circuitry comprises switch circuitry and a converter circuit coupled to the switch circuitry, and wherein the fourth circuitry to control the first VR mode of the regulator circuitry comprises the fourth circuitry to operate the switch circuitry to provide a conductive path between the port and the converter circuit.

In one or more sixteenth embodiments, further to the fifteenth embodiment, the fourth circuitry to control the first VR mode of the regulator circuitry comprises the fourth circuitry to control one of a buck mode of the converter circuit, or a boost mode of the converter circuit.

In one or more seventeenth embodiments, further to the thirteenth embodiment, the regulator circuitry comprises switch circuitry and a converter circuit coupled to the switch circuitry, and wherein the fourth circuitry to control the first VR mode of the regulator circuitry comprises the fourth circuitry to operate the switch circuitry to disable a conductive path between the battery and the first node.

In one or more eighteenth embodiments, further to any of the tenth through thirteenth embodiments, the third circuitry is to participate in communications with the programmable power supply via the port, wherein the communications are compatible with a Universal Serial Bus Power Delivery specification.

In one or more nineteenth embodiments, a method comprises detecting a transition of one or more loads to a first operational mode, wherein a platform comprises the one or more loads, a port, regulator circuitry coupled between the port and a first node, and a battery coupled to the one or more loads via the first node, receiving an indication of an amount of charge stored by the battery, based on the transition and the amount of charge, identifying a first voltage regulation (VR) mode of the regulator circuitry to provide a first level of a first voltage at the first node, wherein the first VR mode corresponds to a first power loss by the first circuitry, and a second level of a second voltage, wherein the second level is based on the first power loss, and signaling that a programmable power supply is to provide the second voltage at the second level to deliver power to the platform via the port.

In one or more twentieth embodiments, further to the nineteenth embodiment, identifying the second level of the second voltage comprises determining an amount of power to be delivered by the programmable power supply based on a sum of a required level of power to be delivered from the first node, and an amount of the first power loss by the regulator circuitry.

In one or more twenty-first embodiments, further to the nineteenth embodiment or the twentieth embodiment, the first operational mode comprises a combination of respective configurations of multiple loads comprising a central processing unit and a graphics processing unit, and wherein identifying the first VR mode and the second voltage is based on a thermal design point of the multiple loads.

In one or more twenty-second embodiments, further to any of the nineteenth through twenty-first embodiments, the method further comprises controlling the first VR mode of the regulator circuitry.

In one or more twenty-third embodiments, further to the twenty-second embodiment, the regulator circuitry comprises switch circuitry and a converter circuit coupled to the switch circuitry, and wherein the controlling the first VR mode of the regulator circuitry comprises operating the switch circuitry to enable a conductive path which bypasses the converter circuit.

In one or more twenty-fourth embodiments, further to the twenty-second embodiment, the regulator circuitry comprises switch circuitry and a converter circuit coupled to the switch circuitry, and wherein the controlling the first VR mode of the regulator circuitry comprises operating the switch circuitry to provide a conductive path between the port and the the converter circuit.

In one or more twenty-fifth embodiments, further to the twenty-fourth embodiment, the controlling the first VR mode of the regulator circuitry comprises controlling one of a buck mode of the converter circuit, or a boost mode of the converter circuit.

In one or more twenty-sixth embodiments, further to the twenty-second embodiment, the regulator circuitry comprises switch circuitry and a converter circuit coupled to the switch circuitry, and wherein the controlling the first VR mode of the regulator circuitry comprises operating the switch circuitry to disable a conductive path between the battery and the first node.

In one or more twenty-seventh embodiments, further to any of the nineteenth through twenty-first embodiments, the signaling comprises participating in communications with the programmable power supply via the port, wherein the communications are compatible with a Universal Serial Bus Power Delivery specification.

In one or more twenty-eighth embodiments, one or more computer-readable storage media having stored thereon instructions which, when executed by one or more processing units, cause the one or more processing units to perform a method comprising detecting a transition of one or more loads to a first operational mode, wherein a platform comprises the one or more loads, a port, regulator circuitry coupled between the port and a first node, and a battery coupled to the one or more loads via the first node, receiving an indication of an amount of charge stored by the battery, based on the transition and the amount of charge, identifying a first voltage regulation (VR) mode of the regulator circuitry to provide a first level of a first voltage at the first node, wherein the first VR mode corresponds to a first power loss by the first circuitry, and a second level of a second voltage, wherein the second level is based on the first power loss, and signaling that a programmable power supply is to provide the second voltage at the second level to deliver power to the platform via the port.

In one or more twenty-ninth embodiments, further to the twenty-eighth embodiment, identifying the second level of the second voltage comprises determining an amount of power to be delivered by the programmable power supply based on a sum of a required level of power to be delivered from the first node, and an amount of the first power loss by the regulator circuitry.

In one or more thirtieth embodiments, further to the twenty-eighth embodiment or the twenty-ninth embodiment, the first operational mode comprises a combination of respective configurations of multiple loads comprising a central processing unit and a graphics processing unit, and wherein identifying the first VR mode and the second voltage is based on a thermal design point of the multiple loads.

In one or more thirty-first embodiments, further to any of the twenty-eighth through thirtieth embodiments, the method further comprises controlling the first VR mode of the regulator circuitry.

In one or more thirty-second embodiments, further to the thirty-first embodiment, the regulator circuitry comprises switch circuitry and a converter circuit coupled to the switch circuitry, and wherein the controlling the first VR mode of the regulator circuitry comprises operating the switch circuitry to enable a conductive path which bypasses the converter circuit.

In one or more thirty-third embodiments, further to the thirty-first embodiment, the regulator circuitry comprises switch circuitry and a converter circuit coupled to the switch circuitry, and wherein the controlling the first VR mode of the regulator circuitry comprises operating the switch circuitry to provide a conductive path between the port and the converter circuit.

In one or more thirty-fourth embodiments, further to the thirty-third embodiment, the controlling the first VR mode of the regulator circuitry comprises controlling one of a buck mode of the converter circuit, or a boost mode of the converter circuit.

In one or more thirty-fifth embodiments, further to the thirty-first embodiment, the regulator circuitry comprises switch circuitry and a converter circuit coupled to the switch circuitry, and wherein the controlling the first VR mode of the regulator circuitry comprises operating the switch circuitry to disable a conductive path between the battery and the first node.

In one or more thirty-sixth embodiments, further to any of the twenty-eighth through thirtieth embodiments, the signaling comprises participating in communications with the programmable power supply via the port, wherein the communications are compatible with a Universal Serial Bus Power Delivery specification.

In one or more thirty-seventh embodiments, a device comprises a port to couple the device to a programmable power supply, a load circuit coupled to a first node, regulator circuitry coupled between the port and the first node, and controller circuitry, coupled to the regulator circuitry, to receive an indication of a first operational mode of the load circuit, wherein, based on the indication, the controller circuitry is to identify, based on an amount of charge of a battery coupled to the load circuit via the first node, a first voltage regulation (VR) mode of the regulator circuitry to provide a first level of a first voltage at the first node, wherein the first VR mode corresponds to a first power loss by the regulator circuitry, and identify a second level of a second voltage, wherein the second level is based on the first power loss, and signal that the programmable power supply is to provide the second voltage at the second level to deliver power to the device via the port.

In one or more thirty-eighth embodiments, further to the thirty-seventh embodiment, the controller circuitry to identify the second level of the second voltage comprises the controller circuitry to determine an amount of power to be delivered by the programmable power supply based on a sum of a required level of power to be delivered from the first node, and an amount of the first power loss by the regulator circuitry.

In one or more thirty-ninth embodiments, further to the thirty-seventh embodiment or the thirty-eighth embodiment, the first operational mode comprises a combination of respective configurations of multiple loads comprising a central processing unit and a graphics processing unit, and wherein the controller circuitry is to identify the first VR mode and the second voltage based on a thermal design point of the multiple loads.

In one or more fortieth embodiments, further to any of the thirty-seventh through thirty-ninth embodiments, the controller circuitry is further to control the first VR mode of the regulator circuitry.

In one or more forty-first embodiments, further to the fortieth embodiment, the regulator circuitry comprises switch circuitry and a converter circuit coupled to the switch circuitry, and wherein the controller circuitry to control the first VR mode of the regulator circuitry comprises the controller circuitry to operate the switch circuitry to enable a conductive path which bypasses the converter circuit.

In one or more forty-second embodiments, further to the fortieth embodiment, the regulator circuitry comprises switch circuitry and a converter circuit coupled to the switch circuitry, and wherein the controller circuitry to control the first VR mode of the regulator circuitry comprises the controller circuitry to operate the switch circuitry to provide a conductive path between the port and the converter circuit.

In one or more forty-third embodiments, further to the forty-second embodiment, the controller circuitry to control the first VR mode of the regulator circuitry comprises the controller circuitry to control one of a buck mode of the converter circuit, or a boost mode of the converter circuit.

In one or more forty-fourth embodiments, further to the fortieth embodiment, the regulator circuitry comprises switch circuitry and a converter circuit coupled to the switch circuitry, and wherein the controller circuitry to control the first VR mode of the regulator circuitry comprises the controller circuitry to operate the switch circuitry to disable a conductive path between the battery and the first node.

In one or more forty-fifth embodiments, further to any of the thirty-seventh through thirty-ninth embodiments, the third circuitry is to participate in communications with the programmable power supply via the port, wherein the communications are compatible with a Universal Serial Bus Power Delivery specification.

Techniques and architectures for configuring a programmable power supply are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A device comprising:
    first circuitry to detect a transition of one or more loads to a first operational mode while a platform comprises the device, the one or more loads, a port, regulator circuitry coupled between the port and a first node, and a battery coupled to the one or more loads via the first node;
    second circuitry, coupled to the first circuitry, to receive an indication of an amount of charge stored by the battery, the second circuitry further to identify, based on the transition and the amount of charge:
        a first voltage regulation (VR) mode of the regulator circuitry to provide a first level of a first voltage at the first node, wherein the first VR mode corresponds to a first power loss by the first circuitry; and
        a second level of a second voltage, wherein the second level is based on the first power loss;
    third circuitry, coupled to the second circuitry, to signal that a programmable power supply is to provide the second voltage at the second level to deliver power to the platform via the port.

2. The device of claim 1, wherein the second circuitry to identify the second level of the second voltage comprises the second circuitry to determine an amount of power to be delivered by the programmable power supply based on a sum of:
    a required level of power to be delivered from the first node; and
    an amount of the first power loss by the regulator circuitry.

3. The device of claim 1, wherein the operational mode comprises a combination of respective configurations of multiple loads comprising a central processing unit and a graphics processing unit, and wherein the second circuitry is to identify the first VR mode and the second voltage based on a thermal design point of the multiple loads.

4. The device of claim 1, further comprising:
    fourth circuitry, coupled to the second circuitry, to control the first VR mode of the regulator circuitry.

5. The device of claim 4, wherein the regulator circuitry comprises switch circuitry and a converter circuit coupled to the switch circuitry; and
    wherein the fourth circuitry to control the first VR mode of the regulator circuitry comprises the fourth circuitry to operate the switch circuitry to enable a conductive path which bypasses the converter circuit.

6. The device of claim 4, wherein the regulator circuitry comprises switch circuitry and a converter circuit coupled to the switch circuitry; and
    wherein the fourth circuitry to control the first VR mode of the regulator circuitry comprises the fourth circuitry to operate the switch circuitry to provide a conductive path between the port and the converter circuit.

7. The device of claim 6, wherein the fourth circuitry to control the first VR mode of the regulator circuitry comprises the fourth circuitry to control one of a buck mode of the converter circuit, or a boost mode of the converter circuit.

8. The device of claim 4, wherein the regulator circuitry comprises switch circuitry and a converter circuit coupled to the switch circuitry; and wherein the fourth circuitry to control the first VR mode of the regulator circuitry comprises the fourth circuitry to operate the switch circuitry to disable a conductive path between the battery and the first node.

9. The device of claim 1, wherein the third circuitry is to participate in communications with the programmable power supply via the port, wherein the communications are compatible with a Universal Serial Bus Power Delivery specification.

10. A system comprising:
a first device comprising:
first circuitry to detect a transition of one or more loads to a first operational mode while a platform comprises the first device, the one or more loads, a port, regulator circuitry coupled between the port and a first node, and a battery coupled to the one or more loads via the first node;
second circuitry, coupled to the first circuitry, to receive an indication of an amount of charge stored by the battery, the second circuitry further to identify, based on the transition and the amount of charge:
a first voltage regulation (VR) mode of the regulator circuitry to provide a first level of a first voltage at the first node, wherein the first VR mode corresponds to a first power loss by the first circuitry; and
a second level of a second voltage, wherein the second level is based on the first power loss;
third circuitry, coupled to the second circuitry, to signal that a programmable power supply is to provide the second voltage at the second level to deliver power to the platform via the port; and
a display device coupled to the first device, the display device to display an image based on a signal communicated with the one or more loads.

11. The system of claim 10, wherein the second circuitry to identify the second level of the second voltage comprises the second circuitry to determine an amount of power to be delivered by the programmable power supply based on a sum of:
a required level of power to be delivered from the first node; and
an amount of the first power loss by the regulator circuitry.

12. The system of claim 10, wherein the operational mode comprises a combination of respective configurations of multiple loads comprising a central processing unit and a graphics processing unit, and wherein the second circuitry is to identify the first VR mode and the second voltage based on a thermal design point of the multiple loads.

13. The system of claim 10, the first device further comprising:
fourth circuitry, coupled to the second circuitry, to control the first VR mode of the regulator circuitry.

14. The system of claim 13, wherein the regulator circuitry comprises switch circuitry and a converter circuit coupled to the switch circuitry; and wherein the fourth circuitry to control the first VR mode of the regulator circuitry comprises the fourth circuitry to operate the switch circuitry to enable a conductive path which bypasses the converter circuit.

15. The system of claim 10, wherein the third circuitry is to participate in communications with the programmable power supply via the port, wherein the communications are compatible with a Universal Serial Bus Power Delivery specification.

16. A device comprising:
a port to couple the device to a programmable power supply;
a load circuit coupled to a first node;
regulator circuitry coupled between the port and the first node; and
controller circuitry, coupled to the regulator circuitry, to receive an indication of a first operational mode of the load circuit, wherein, based on the indication, the controller circuitry is to:
identify, based on an amount of charge of a battery coupled to the load circuit via the first node, a first voltage regulation (VR) mode of the regulator circuitry to provide a first level of a first voltage at the first node, wherein the first VR mode corresponds to a first power loss by the regulator circuitry; and
identify a second level of a second voltage, wherein the second level is based on the first power loss; and
signal that the programmable power supply is to provide the second voltage at the second level to deliver power to the device via the port.

17. The device of claim 16, wherein the controller circuitry to identify the second level of the second voltage comprises the controller circuitry to determine an amount of power to be delivered by the programmable power supply based on a sum of:
a required level of power to be delivered from the first node; and
an amount of the first power loss by the regulator circuitry.

18. The device of claim 16, wherein the first operational mode comprises a combination of respective configurations of multiple loads comprising a central processing unit and a graphics processing unit, and wherein the controller circuitry is to identify the first VR mode and the second voltage based on a thermal design point of the multiple loads.

19. The device of claim 16, wherein the controller circuitry is further to control the first VR mode of the regulator circuitry.

20. The device of claim 19, wherein the regulator circuitry comprises switch circuitry and a converter circuit coupled to the switch circuitry; and
wherein the controller circuitry to control the first VR mode of the regulator circuitry comprises the controller circuitry to operate the switch circuitry to enable a conductive path which bypasses the converter circuit.

* * * * *